United States Patent
Zhong

(10) Patent No.: US 9,319,259 B2
(45) Date of Patent: Apr. 19, 2016

(54) METHODS FOR MAPPING AND DE-MAPPING DATA, TRANSMITTING DEVICE AND RECEIVING DEVICE

(75) Inventor: Chuan Zhong, Beijing (CN)

(73) Assignees: Samsung Electronics Co., Ltd., Suwon-si (KR); Beijing Samsung Telecom R & D Center, Beijing (CN)

( * ) Notice: Subject to any disclaimer, the term of this patent is extended or adjusted under 35 U.S.C. 154(b) by 332 days.

(21) Appl. No.: 12/907,247

(22) Filed: Oct. 19, 2010

(65) Prior Publication Data

US 2011/0090977 A1 Apr. 21, 2011

(30) Foreign Application Priority Data

Oct. 19, 2009 (CN) .......................... 2009 1 0204164

(51) Int. Cl.
*H04L 27/28* (2006.01)
*H04L 27/26* (2006.01)
*H04L 5/00* (2006.01)

(52) U.S. Cl.
CPC .......... *H04L 27/2628* (2013.01); *H04L 5/0044* (2013.01); *H04L 27/265* (2013.01)

(58) Field of Classification Search
CPC ... H04L 5/0042; H04L 5/0044; H04L 27/265; H04L 27/2628; H04L 27/261; H04L 27/2605
USPC ......... 375/130, 149, 257, 259, 260, 261, 267, 375/295, 296, 299, 316, 324, 340, 350; 370/208, 210, 315, 329, 330, 331, 343, 370/350
See application file for complete search history.

(56) References Cited

U.S. PATENT DOCUMENTS

| 7,106,689 | B1 * | 9/2006 | Sudo .......................... H04L 1/04 370/208 |
| 2007/0082648 | A1 * | 4/2007 | Gallagher .................. 455/343.2 |
| 2009/0092193 | A1 * | 4/2009 | Fujita ............................ 375/260 |
| 2009/0122897 | A1 * | 5/2009 | Belogolovy et al. .......... 375/267 |
| 2009/0303866 | A1 * | 12/2009 | Li et al. .......................... 370/208 |
| 2010/0110873 | A1 * | 5/2010 | Han et al. ..................... 370/208 |
| 2010/0166089 | A1 * | 7/2010 | Seki .................... H04J 11/0069 375/260 |
| 2010/0322179 | A1 * | 12/2010 | Yu et al. ........................ 370/329 |
| 2011/0075707 | A1 * | 3/2011 | Duan .................... H04L 5/0044 375/144 |
| 2012/0008577 | A1 * | 1/2012 | Han et al. ...................... 370/329 |

FOREIGN PATENT DOCUMENTS

CN 101202727 A 6/2008
WO WO 2007118411 A1 * 10/2007

* cited by examiner

Primary Examiner — Syed Haider
(74) Attorney, Agent, or Firm — Jefferson IP Law, LLP

(57) ABSTRACT

An apparatus and a method for mapping data and de-mapping data are provided. In the method, each modulated datum is mapped into two centrosymmetric Orthogonal Frequency Division Multiplexing (OFDM) subcarriers at the transmitting end, a certain functional transformation is performed on data in one of the two OFDM subcarriers, and original data may be restored at the receiving end according to data of the two centrosymmetric OFDM subcarriers. Exemplary embodiments of the invention also provide a transmitting device and a receiving device. By adopting embodiments of the invention, self-cancellation of interference among subcarriers may be implemented effectively, and the interference among subcarriers may be reduced.

8 Claims, 3 Drawing Sheets

METHODS FOR MAPPING AND DE-MAPPING DATA, TRANSMITTING DEVICE AND RECEIVING DEVICE

PRIORITY

This application claims the benefit under 35 U.S.C. §119(a) of a Chinese patent application filed on Oct. 19, 2009 in the Chinese Intellectual Property Office and assigned Serial No. 200910204164.5, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are 1) Samsung Electronics Co., Ltd., and 2) Beijing Samsung Telecom R&D Center.

BACKGROUND OF THE INVENTION

1. Field of the Invention

The present invention relates to Orthogonal Frequency Division Multiplexing (OFDM)/Orthogonal Frequency Division Multiplexing Access (OFDMA) technologies. More particularly, the present invention relates to a method for mapping data, a method for de-mapping data, a transmitting device and a receiving device.

2. Description of the Related Art

OFDM technology is a type of communication technology that more effectively transmits information using channels. That is, OFDM technology utilizes multiple parallel subcarriers, which may also be referred to as subcarrier frequencies, that transmit low-rate data, to achieve communication of high-rate data. A technical point of the OFDM technology is as follows. The transmitting bandwidth of a channel is divided into several sub-frequency bands. The transmitting end transmits data information in parallel with subcarriers that are mutually orthogonal in each sub-frequency band, and the receiving end extracts the data information transmitted in parallel utilizing orthogonality of each subcarrier.

The OFDM technology has been applied in many communication systems successfully. For example, the OFDM technology is used as the air interface for Data Audio Broadcast (DAB) and Digital Video Broadcast (DVB) established by European Telecommunications Standards Institute (ETSI). The OFDM technology is also adopted by the Institute of Electrical and Electronics Engineer's (IEEE) wireless Local Area Network (LAN) standard IEEE 802.11 and wireless Metropolitan Area Network (MAN) standard IEEE 802.16. Besides, with continuous updating of communication services technology, various new service requirements continuously emerge and the OFDMA technology continues to be widely used. The OFDMA technology, which is based on the OFDM technology, divides different resource blocks in time-frequency resources to form different sub-channels, and allocates different services for different sub-channels, to achieve greater flexibility.

Although the OFDM technology has many advantages, it is very sensitive to frequency-offset error. When a frequency-offset error occurs, data that is transmitted with various subcarriers that are originally mutually orthogonal becomes interference to other subcarriers. Thus, Inter-Carrier Interference (ICI) is generated. More particularly, when a mobile station receives signals from different base stations, different frequency-offset errors will cause more complex interference among subcarriers. In addition, when a mobile station moves with a high speed, a Doppler spread may also lead to interference among subcarriers.

Several solutions for the ICI problem have been proposed, for example, adopting balancing technology, spread spectrum technology, etc. However, implementation of these technologies is very complex.

Accordingly, there is a need for an improved apparatus and method for mapping and transmitting data so as to reduce interference among subcarriers.

SUMMARY OF THE INVENTION

An aspect of the present invention is to address at least the above-mentioned problems and/or disadvantages and to provide at least the advantages described below. Accordingly, an aspect of the invention is to provide an apparatus and method for mapping data so as to reduce interference among subcarriers.

Another aspect of the invention is to provide an apparatus and method for de-mapping data so as to reduce interference among subcarriers.

In accordance with an aspect of the present invention, a method for mapping data is provided. The method includes dividing modulated data into groups, wherein each group includes M data, mapping M data of each group onto adjacent Orthogonal Frequency Division Multiplexing (OFDM) subcarriers, and performing a functional transformation on data in one of the two OFDM subcarrier according to a preset function.

In accordance with yet another aspect of the present invention, a transmitting device is provided. The transmitting device includes a modulation module, and a mapping module, for dividing data modulated by the modulation module into groups, in which each group includes M data, for mapping M data in each group into adjacent OFDM subcarriers, and for performing a functional transformation on data in one of the two OFDM subcarriers with a preset function.

In accordance with still another aspect of the invention, a method for de-mapping data is provided. The method includes dividing OFDM subcarriers into groups, extracting data sequentially from two centrosymmetric OFDM subcarriers in the OFDM subcarriers, performing a functional transformation on data in one of the two OFDM subcarriers with a preset function, and restoring corresponding data according to a result of the functional transformation and data in the other one of the two OFDM subcarriers.

In accordance with another aspect of the invention, a receiving device is provided. The receiving device includes a de-mapping module, for dividing OFDM subcarriers into groups, for performing a functional transformation on data in one of the two OFDM subcarriers with a preset function, and for restoring corresponding data according to a result of the functional transformation and data in the other one of the two OFDM subcarriers.

Other aspects, advantages, and salient features of the invention will become apparent to those skilled in the art from the following detailed description, which, taken in conjunction with the annexed drawings, discloses exemplary embodiments of the invention.

BRIEF DESCRIPTIONS OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
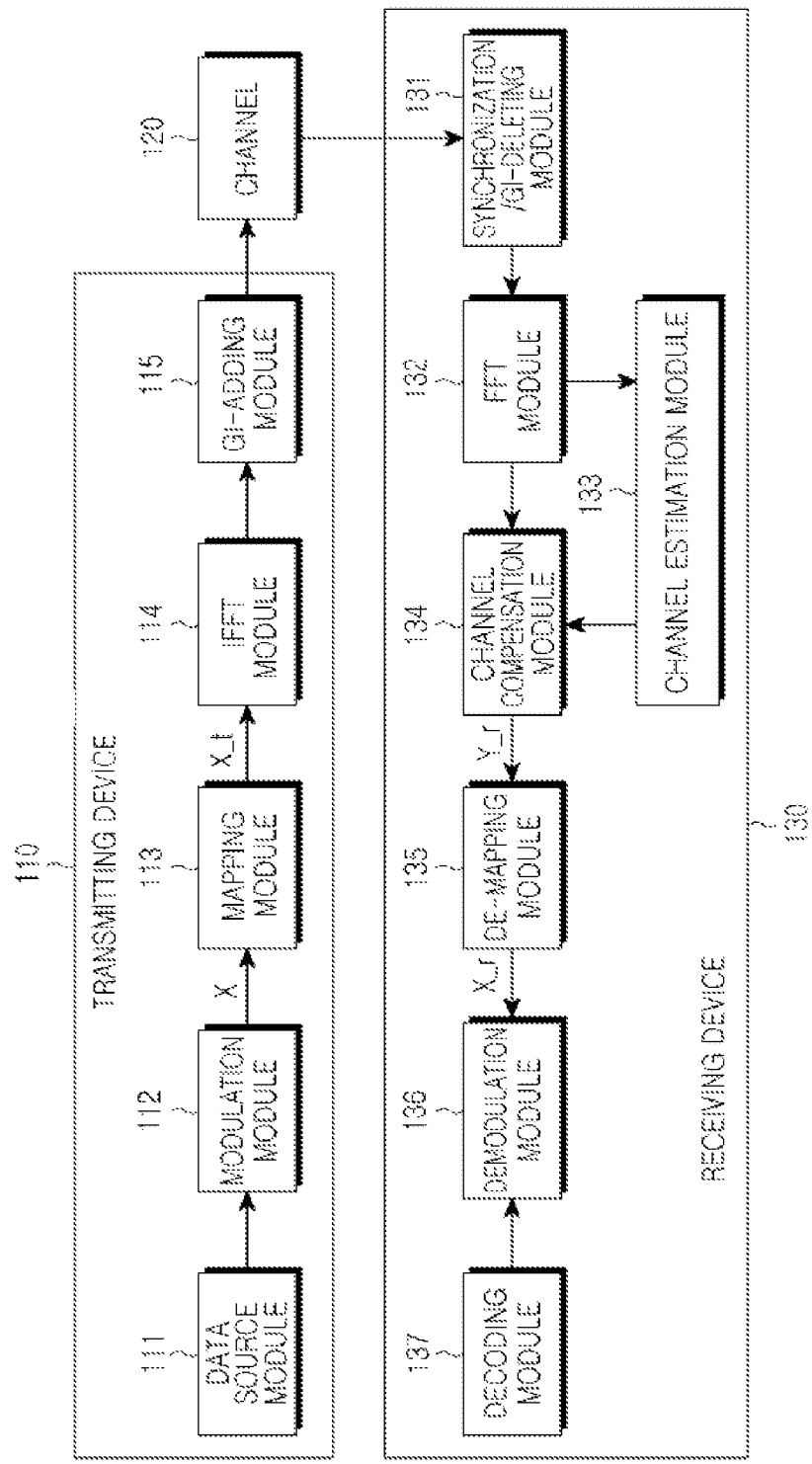
FIG. 1 is a schematic diagram illustrating a structure of an Orthogonal Frequency Division Multiplexing (OFDM) transmitting system according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

According to exemplary embodiments of the present invention, at a transmitting end, each modulated datum is mapped into two centrosymmetric Orthogonal Frequency Division Multiplexing (OFDM) subcarriers, and a certain functional transformation is performed on the data in one OFDM subcarrier thereof. At the receiving end, original data may be restored according to data of the two centrosymmetric OFDM subcarriers. When frequency-offset interference occurs, the phase of an interference coefficient among subcarriers changes linearly. By mapping the data into two centrosymmetric subcarriers and restoring the original data according to the data of the two subcarriers, interference having a reverse vector direction of the interference coefficient is introduced in the process of restoring the original data. Thus, interference self-cancellation may be implemented effectively, and interference among subcarriers may be reduced.

Exemplary embodiments of the invention provide methods for mapping data and methods for de-mapping data. A more detailed description of these concepts is provided in the following.

An exemplary method for mapping data includes the following. First, modulated data is divided into groups, in which each group includes M data. The M data in each group is mapped into 2M adjacent OFDM subcarriers. When performing the mapping, each datum is respectively mapped into two centrosymmetric OFDM subcarriers in the 2M adjacent OFDM subcarriers, and a functional transformation is performed on the data in one of the two OFDM subcarriers with a preset function.

Various available function transformation modes may be adopted to perform functional transformation for the data. For example, functions, such as obtaining a conjugate, obtaining an opposite-number, obtaining a reverse-conjugate, and the like may be adopted to perform functional transformation. As an alternative, a functional transformation may not be performed on the data, that is, the value of the data may itself be utilized.

An exemplary method for de-mapping data at a receiving end includes the following. Subcarriers are divided into groups, in which each group includes 2M adjacent OFDM subcarriers. Data of two centrosymmetric OFDM subcarriers in the 2M adjacent OFDM subcarriers is extracted sequentially, and a functional transformation is performed on the data in one of the two OFDM subcarriers with a preset function. Corresponding data may be restored according to a result of the functional transformation and data of the other one of the two OFDM subcarriers.

Another exemplary method for mapping data includes the following. Modulated data is divided into groups, in which each group includes M data. The M data in each group is mapped into 2M−1 adjacent OFDM subcarriers. When performing the mapping, one datum of the M data is mapped into an OFDM subcarrier at the center of the 2M−1 adjacent OFDM subcarriers, each datum of the M data except for the one datum above is respectively mapped into two centrosymmetric OFDM subcarriers in the 2M−1 adjacent OFDM subcarriers. A functional transformation is performed on data in one of the two OFDM subcarriers with a preset function.

As described above, various available functional transformation modes may be adopted in the method to perform functional transformation on the data. For example, functions such as obtaining a conjugate, obtaining an opposite-number, obtaining a reverse-conjugate, obtaining the value of the data itself, and the like may be used.

An exemplary method for de-mapping data at a receiving end includes the following. First, OFDM subcarriers are divided into groups, in which each group includes 2M−1 adjacent OFDM subcarriers. One datum may be restored according to data in the OFDM subcarrier at the center of the 2M−1 adjacent OFDM subcarriers, and data of two centrosymmetric OFDM subcarriers in the 2M−1 adjacent OFDM subcarriers is extracted sequentially. A functional transformation is performed on the data in one of the two OFDM subcarriers with a preset function. Corresponding data may be restored according to a result of the functional transformation and data of the other one of the two OFDM subcarriers.

FIG. 1 is a schematic diagram illustrating a structure of an OFDM transmitting system according to an exemplary embodiment of the present invention.

Referring to FIG. 1, the OFDM transmitting system includes transmitting device 110, channel 120, and receiving device 130. Transmitting device 110 transmits data to receiving device 130 via channel 120, after performing a series of processes at the transmitting end. Receiving device 130 may obtain original data, after performing a series of processes on the received data at the receiving end.

Compared with a conventional OFDM transmitting device that includes data source module 111, modulation module 112, Inverse Fast Fourier Transformation (IFFT) module 114 and Guard Interval-adding (GI-adding) module 115, transmitting device 120 further includes mapping module 113.

Furthermore, as compared with a conventional OFDM receiving device that includes synchronization/GI-deleting module 131, Fast Fourier Transformation (FFT) module 132, channel estimation module 133, channel compensation module 134, demodulation module 136 and decoding module 137, receiving device 130 further includes de-mapping module 135.

Exemplary processes performed at the transmitting end may include the following.

Binary data, which may be encoded data, is generated in data source module 111. Modulation data may be formed by modulation module 112 according to a modulation constellation diagram on the basis of the binary data received from data source module 111. The modulation data may be sent by modulation module 112 to mapping module 113. On the assumption that the data length is M, the modulation data may be denoted as follows.

$X(m), m=0 \ldots M-1$

The M data may be mapped into 2M adjacent subcarriers by mapping module 113. Each datum is mapped into two centrosymmetric subcarriers and a functional transformation may be performed on right-handed data of the 2M adjacent subcarriers. Furthermore, a functional transformation may also be performed on left-handed data, which needs corresponding modification made by the receiving device when performing receiving processes. Using the obtaining of a conjugate as an example, if data mapping is started at the center of 2M adjacent subcarriers, data denoted with Equation (1) will be obtained.

$$X\_t(i) = \begin{cases} X(M-i-1) & \text{(if } (i<M)) \\ X^*(i-M) & \text{(if } (i>=M)) \end{cases} \quad i=0 \ldots 2M-1 \qquad (1)$$

The result eventually formed is: $X\_t = X(M-1) \ldots X(1)X(0)X^*(0)X^*(1) \ldots X^*(M-1)$ If the data mapping is started from both sides of the 2M adjacent subcarriers, data denoted with Equation (2) will be obtained.

$$X\_t(i) = \begin{cases} X(i) & \text{(if } (i<M)) \\ X^*(2M-1-i) & \text{(if } (i>=M)) \end{cases} \quad i=0 \ldots 2M-1 \qquad (2)$$

The result eventually formed is: $X\_t = X(0)X(1) \ldots X(M-1)X^*(M-1) \ldots X^*(1)X^*(0)$ Regardless of which mode is adopted to perform the mapping, it is only necessary to adopt a corresponding mode at the receiving end to de-map.

In the foregoing description, an example is provided in which M data is mapped into 2M adjacent subcarriers. When mapping M data into 2M−1 adjacent subcarriers, one datum of the M data may be mapped into a subcarrier at the center, and the remaining M−1 data may be mapped into remaining 2(M−1) subcarriers. For example, the form of $X\_t = X(M-1) \ldots X(1)X(0)X(1) \ldots X^*(M-1)$ may be used for mapping.

When finishing the processing of data of this group, if there is still idle data in the subcarrier, the mapping of data of a next group may proceed until an integrated OFDM frequency-domain symbol is formed. The integrated OFDM frequency-domain symbol may be sent to IFFT module 114.

An IFFT transformation from frequency-domain to time-domain is completed in IFFT module 114. A Cyclic Prefix (CP) is added at GI-adding module 115 prior to transmission of the data.

According to an exemplary embodiment, processes performed at a receiving end are described below.

Synchronization and GI-deleting operations are performed on the received data at synchronization/GI-deleting module 131. An FFT transformation from a time-domain signal to a frequency-domain signal is performed at FFT module 132. Channel compensation is performed for received frequency-domain data at channel compensation module 134 according to information received from channel estimation module 133. The data received after the above processes may be sent to de-mapping module 135. Input data of de-mapping module 135 may be recorded as follows.

$Y\_r(m), m=0 \ldots 2M-1$

When data mapping is performed by mapping module 113 according to Equation (1), de-mapping operations of de-mapping module 135 may include extracting data from a symmetrical location of $Y\_r(m)$, $m=0 \ldots 2M-1$ sequentially, and restoring data according to Equation (3).

$$X\_r(i) = \frac{1}{2}(Y\_r(M-i-1) + Y\_r^*(M+i)) \quad i=0 \ldots M-1 \qquad (3)$$

Thus, M data signals may be restored. Also, the original data may be restored after being demodulated by demodulation module 136 and after passing decoding module 137.

The above descriptions were of an example that included obtaining a conjugate. In the following description, examples are provided in which other functions are adopted to perform the functional transformation.

For example, data of two sides may adopt copied data, that is, no functional transformation will be performed on the data, as denoted with Equation (4).

$$X\_t(i) = \begin{cases} X(M-i-1)(\text{if}(i<M)) \\ X(i-M)(\text{if}(i>=M)) \end{cases} \quad i=0 \ldots 2M-1 \qquad (4)$$

Thus, data of the two sides are the same, and they may be directly added and then be averaged at the receiving end, as denoted with Equation (5).

$$X\_r(i) = \frac{1}{2}(Y\_r(M-i-1) + Y\_r(M+i)) \quad i=0 \ldots M-1 \qquad (5)$$

For another example, an opposite number may be obtained for data at one side, as denoted with Equation (6).

$$X\_t(i) = \begin{cases} X(M-i-1)(\text{if}(i<M)) \\ -X(i-M)(\text{if}(i>=M)) \end{cases} \quad i=0 \ldots 2M-1 \qquad (6)$$

Under this circumstance, two data may be directly subtracted and then be averaged at the receiving end, as denoted with Equation (7).

$$X\_r(i) = \frac{1}{2}(Y\_r(M - i - 1) - Y\_r(M + i)) \quad i = 0 \ldots M - 1 \qquad (7)$$

As yet another example, a reverse conjugate may be obtained for data at one side, as denoted with Equation (8).

$$X\_t(i) = \begin{cases} X(M - i - 1)(\text{if}(i < M)) \\ -X^*(i - M)(\text{if}(i >= M)) \end{cases} \quad i = 0 \ldots 2M - 1 \qquad (8)$$

Correspondingly, operations at the receiving end are denoted with Equation (9).

$$X\_r(i) = \frac{1}{2}(Y\_r(M - i - 1) + (Y - r^*(M + i))) \quad i = 0 \ldots M - 1 \qquad (9)$$

In the following description, two exemplary embodiments are provided to assist in an understanding of the invention.

Exemplary Embodiment 1

Figure 2:
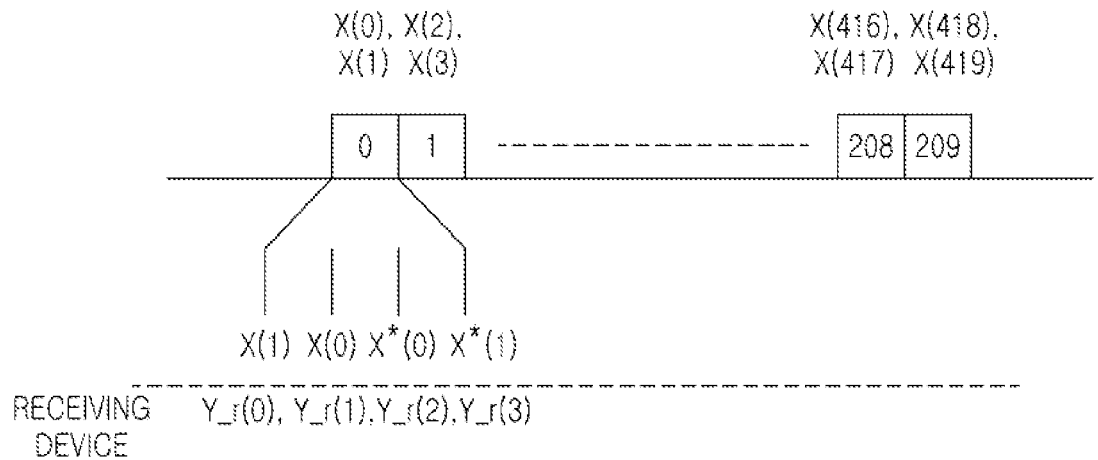
FIG. 2 is a schematic diagram illustrating a method for mapping/de-mapping data according to an exemplary embodiment of the present invention.

FIG. 2 is a schematic diagram illustrating a method for mapping/de-mapping data according to an exemplary embodiment of the present invention.

Supposing one OFDM transmitting system includes 1024 available subcarriers, in which 92 subcarriers are respectively reserved at two sides to be taken as a guard band, and the remaining 840 subcarriers may be adopted to transmit data. First, 840 bits of information will be generated. As an example which adopts Quaternary Phase Shift Keying (QPSK) modulation, after passing the modulation module, modulation data of 420 complex numbers will be formed.

Here, the 840 subcarriers are divided into 210 groups, in which the grouping length of the subcarrier is 4. The 420 complex numbers of modulation data may be allocated to the 210 groups sequentially, in which each group includes 2 data, as shown in FIG. 2. Without loss of generality, data of the first group are X(0) and X(1), and data in the 4 subcarriers of the first group are respectively X(1)X(0)X*(0)X*(1).

After being transmitted in the OFDM system and after being processed with channel compensation, before arriving at de-mapping module 135, data received at locations of 4 corresponding receiving subcarriers are Y_r(0),Y_r(1),Y_r(2),Y_r(3) sequentially. Regenerated receiving data corresponding to X(0)X(1) is:

$$\frac{1}{2}(Y\_r(1) + Y\_r^*(2)), \quad \frac{1}{2}(Y\_r(0) + Y\_r^*(3))$$

Obviously, if various interference factors introduced intermediately are not taken into consideration, the result will be:

$$\frac{1}{2}(X(0) + (X^*(0))^*) = X(0), \quad \frac{1}{2}(X(1) + (X^*(1))^*) = X(1)$$

Exemplary Embodiment 2

Figure 3:
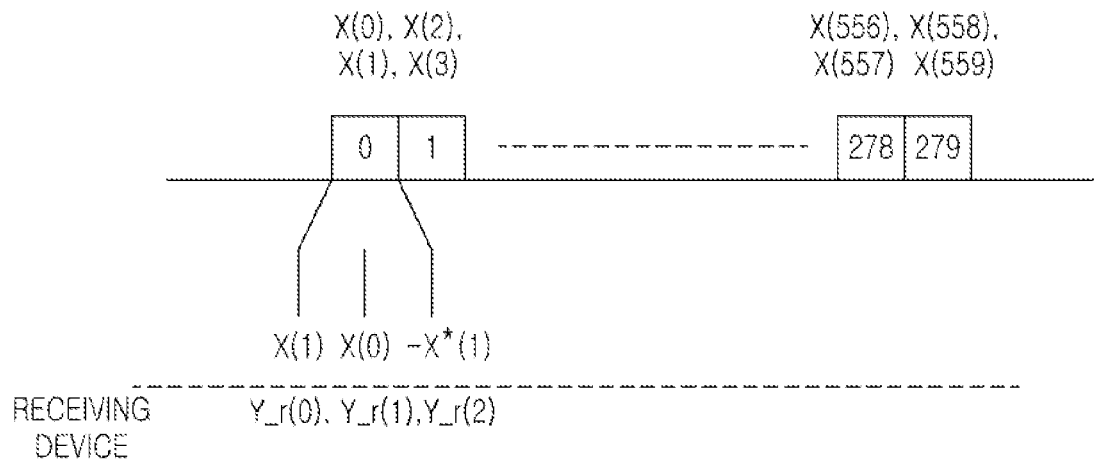
FIG. 3 is a schematic diagram illustrating a method for mapping/de-mapping data according to an exemplary embodiment of the present invention.

FIG. 3 is a schematic diagram illustrating a method for mapping/de-mapping data according to an exemplary embodiment of the present invention.

In the example of FIG. 3, the grouping length of a subcarrier is 3 and a reverse conjugate is obtained at symmetrical locations.

Binary data of 1120 bits is generated and modulated using QPSK modulation, to generate 560 modulation data. 840 subcarriers are divided into 280 groups, the 560 modulation data are allocated to 280 groups sequentially, in which each group includes 2 data as shown in FIG. 3. Without loss of generality, data of the first group are X(0) and X(1), and data in 3 subcarriers of the first group are respectively X(1)X(0)(−X*(1)).

After being transmitted in the OFDM system, and before arriving at de-mapping module 135, data received at locations of 3 corresponding receiving subcarriers are Y_r(0), Y_r(1), Y_r(2) sequentially, and then regenerated receiving data corresponding to X(0)X(1) is:

$$Y\_r(1), \frac{1}{2}(Y\_r(0) - Y\_r^*(2))$$

The original data may be obtained after performing subsequent decoding processes on the regenerated data.

An example is provided in the following, in which a conjugate is obtained for data at one side, so as to demonstrate beneficial effects of a technical scheme of the invention.

With reference to general OFDM transmission, when there is frequency-offset interference, data received at subcarrier k is denoted with Equation (10), $$Y(k) = X(k)S(0) + \sum_{l=0, l \neq k}^{N-1} X(l)S(l - k) + n_k \qquad (10)$$

in which, $$S(l - k) = \frac{\sin(\pi(l + \varepsilon - k))}{N \sin\left(\frac{\pi}{N}(l + \varepsilon - k)\right)} * \exp\left(j\pi\left(1 - \frac{1}{N}\right)(l + \varepsilon - k)\right),$$

is an interference coefficient generated by subcarrier l for subcarrier k.

The interference coefficient denoted with Equation (11) may be obtained after normalization.

$$\frac{S(l - k)}{S(0)} = \frac{\sin\left(\frac{\pi \varepsilon}{N}\right)}{\sin\left(\frac{\pi}{N}(l + \varepsilon - k)\right)} * \exp\left(-j\pi \frac{1}{N}(l - k)\right) \qquad (11)$$

According to Equation (11), it can be seen that the phase of this interference coefficient changes linearly.

Figure 4:
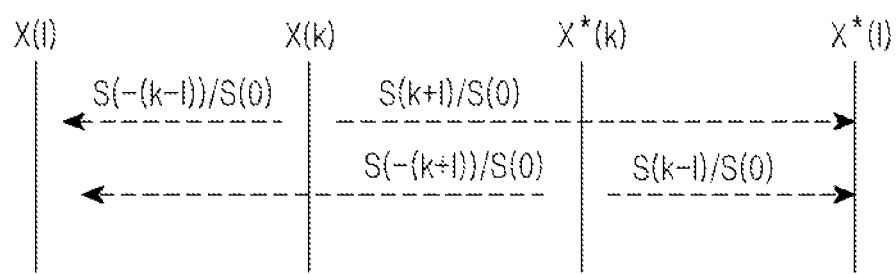
FIG. 4 is a schematic diagram illustrating interference coefficients of any two data pairs according to an exemplary embodiment of the present invention.

FIG. 4 is a schematic diagram illustrating interference coefficients of any two data pairs according to an exemplary embodiment of the present invention.

Referring to FIG. 4, according to an exemplary technical scheme of the invention, any two data pairs are taken. After finishing operations of receiving and combining according to an exemplary implementation of the invention, the interference at X(l) which is generated by X(k) is denoted with Equation (12).

$$X^*(k) \cdot \left[\frac{S(-(k+l))}{S(0)} + \left(\frac{S(k+l)}{S(0)}\right)^*\right] + X(k) \cdot \left[\frac{S(-(k-l))}{S(0)} + \left(\frac{S(k-l)}{S(0)}\right)^*\right] \quad (12)$$

The items in two square brackets of Equation (12) have reverse vector directions. Thus, it can be seen that with reference to interference among subcarriers, self-cancellation characteristics are demonstrated.

The effects are similar, when adopting other functions. Because vector directions are almost reverse, the self-cancellation characteristics may also be demonstrated for interference among subcarriers.

From the above description, it can be seen that, in an exemplary embodiment of the invention, each modulated datum is mapped into two centrosymmetric subcarriers at a transmitting end, a functional transformation is performed on data of one subcarrier thereof, and the original data may be restored at the receiving end according to data of the two centrosymmetric subcarriers. When there is frequency-offset interference, the phase of an interference coefficient among subcarriers changes linearly. By mapping the data into two centrosymmetric subcarriers and restoring the original data according to data of the two subcarriers, interference with reverse vector direction of the interference coefficient is introduced in the process of restoring the original data. Thus, self-cancellation of interference among subcarriers may be implemented effectively, and the interference among subcarriers may be reduced.

It is to be understood that the foregoing is only of exemplary embodiments of the invention, which are not intended to be construed as limiting the scope of the invention. That is, any modifications, equivalent substitutions, improvements, etc., made within the spirit and principle of the invention, should be included in the protection scope of the invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for mapping data in a transmitting device, the method comprising:
   dividing modulated data into groups by a mapper, wherein each group comprises M data, M being a number of the modulated data in a group;
   mapping one datum of the M data onto an orthogonal frequency division multiplexing (OFDM) subcarrier at the center of 2M−1 adjacent OFDM subcarriers;
   respectively mapping each datum except for the one datum into two centrosymmetric OFDM subcarriers in the 2M−1 adjacent OFDM subcarriers;
   performing a functional transformation on each data of the mapped M data in one of two centrosymmetric OFDM subcarriers carrying said each data according to a preset function; and
   transmitting the M data through the 2M−1 adjacent OFDM subcarriers by the transmitting device,
   wherein the functional transformation is performed on right or left handed data of the 2M−1 adjacent OFDM subcarriers, and wherein the preset function comprises obtaining at least one of an opposite-number and a reverse-conjugate.

2. The method according to claim 1, wherein the preset function further comprises at least one of obtaining a conjugate and obtaining the data itself.

3. A transmitting device, the transmitting device comprising:
   a modulator;
   a mapper configured to:
   divide data modulated by the modulator into groups, in which each group comprises M data, M being a number of the modulated data in a group,
   map one datum of the M data onto an orthogonal frequency division multiplexing (OFDM) subcarrier at the center of 2M−1 adjacent OFDM subcarriers,
   respectively map each datum except for the one datum into two centrosymmetric OFDM subcarriers in the 2M−1 adjacent OFDM subcarriers, and
   perform a functional transformation on each data of the mapped M data in one of two centrosymmetric OFDM subcarriers carrying said each data according to a preset function; and
   a transmitter configured to transmit the M data through the 2M−1 adjacent subcarriers,
   wherein the functional transformation is performed on right or left handed data of the 2M−1 adjacent OFDM subcarriers, and
   wherein the preset function comprises obtaining at least one of an opposite-number and a reverse-conjugate.

4. The transmitting device of claim 3, wherein the preset function further comprises at least one of obtaining a conjugate and obtaining the data itself.

5. A method for de-mapping data in a receiving device, the method comprising:
   receiving, by the receiving device, data through orthogonal frequency division multiplexing (OFDM) subcarriers from a transmitting device;
   dividing the OFDM subcarriers into groups by a de-mapper;
   detecting each group of the OFDM subcarriers as comprising 2M−1 adjacent OFDM subcarriers, M being a number of a modulated data in a group;
   extracting the data sequentially from two centrosymmetric OFDM subcarriers in the 2M−1 adjacent OFDM subcarriers;
   performing a functional transformation on the extracted data in one of the two centrosymmetric OFDM subcarriers carrying said each data according to a preset function;
   restoring corresponding data according to a result of the functional transformation and data in the other one of the two centrosymmetric OFDM subcarriers; and
   restoring one datum according to data in an OFDM subcarrier at the center of the 2M−1 adjacent OFDM subcarriers,
   wherein the functional transformation is performed on right or left handed data of the 2M−1 adjacent OFDM subcarriers, and
   wherein the preset function comprises obtaining at least one of an opposite-number and a reverse-conjugate.

6. The method according to claim 5, wherein the preset function further comprises at least one of obtaining a conjugate and obtaining the data itself.

7. A receiving device, the receiving device comprising:
a receiver configured to receive data through orthogonal frequency division multiplexing (OFDM) subcarriers; and
a de-mapper configured to:
divide the OFDM subcarriers into groups,
detect each group of the OFDM subcarriers as comprising 2M−1 adjacent OFDM subcarriers, M being a number of a modulated data in a group,
extract the data sequentially from two centrosymmetric OFDM subcarriers in the 2M−1 adjacent OFDM subcarriers,
perform a functional transformation on the extracted data in one of the two centrosymmetric OFDM subcarriers according to a preset function,
restore corresponding data according to a result of the functional transformation and data in the other one of the two centrosymmetric OFDM subcarriers, and
restore one datum according to data in the OFDM subcarrier at the center of the 2M−1 OFDM subcarriers, wherein the functional transformation is performed on right or left handed data of the 2M−1 adjacent OFDM subcarriers, and
wherein the preset function comprises obtaining an opposite number or a reverse-conjugate.

8. The receiving device of claim 7, wherein the preset function further comprises at least one of obtaining a conjugate and obtaining the data itself.

\* \* \* \* \*